United States Patent Office 3,053,084
Patented Sept. 11, 1962

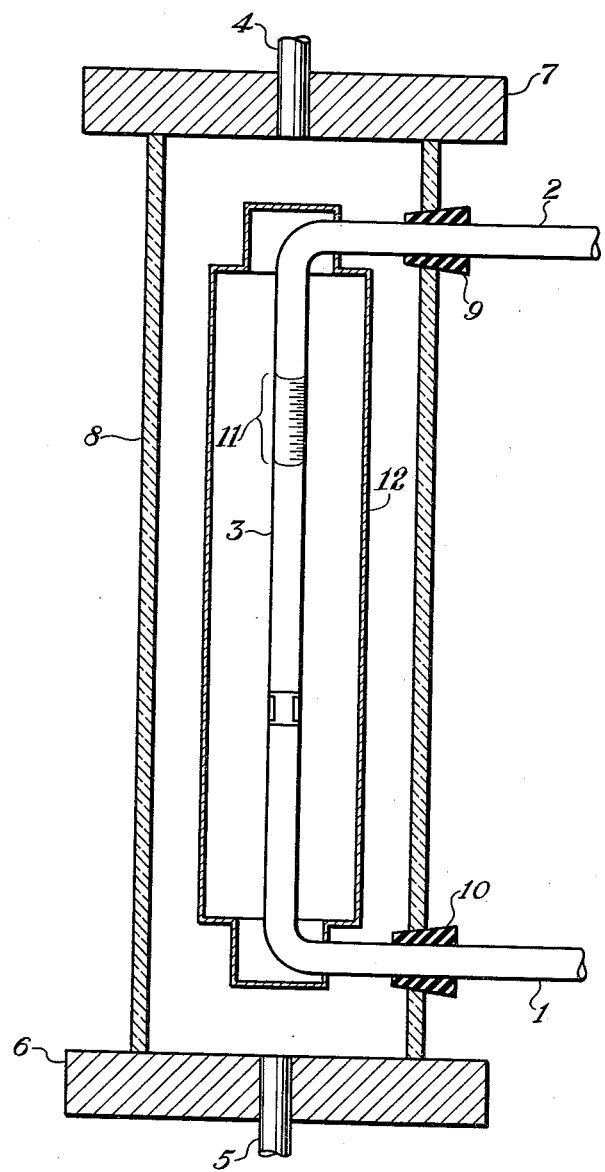

3,053,084
VISUAL METERING TECHNIQUE FOR LOW BOILING LIQUIDS
Elliott P. Doane, Grand Island, N.Y., assignor to Hooker Chemical Company, a corporation of New York
Filed May 19, 1958, Ser. No. 736,368
2 Claims. (Cl. 73—209)

This invention relates to metering fluids by direct visual techniques, such as a rotameter, at temperatures differing from the temperature surrounding the object without causing any heat interchange between the fluid and the surrounding atmosphere while passing through the meter.

There has long been a problem in metering fluids under conditions such that heat transfer from the atmosphere would cause boiling of the fluid in the meter. For large fluid flows an orifice meter may be completely jacketed with a heating or cooling coil to prevent any change either in temperature or in physical state. For smaller flows, however, such meters are usually replaced by rotameters or by capillary meters. Wherever a direct visual reading of the fluid rate is required, a rotameter is preferred. These meters cannot be conveniently jacketed with heating or cooling media without impairing the visibility of the scale. This is particularly true with fluids flowing at temperatures substantially below the ambient temperature. The ambient temperature is the temperature of the medium surrounding an object. In the prior art, refrigerating jackets or coils have been used which cause condensation of moisture which may freeze and completely block the visibility of the rotameter scale. Meters have been immersed in a bath filled with a transparent liquid and have had transparent walls or wall sections but this technique is both cumbersome and not very effective.

The object of this invention is to provide an improved method for observing and regulating the metering of fluids, and especially low-boiling liquids.

The objects and advantages of the invention will be more clearly understood from the description below of preferred embodiments of the invention and the annexed drawing.

I have now found a flow metering device for fluids, and especially for low-boiling liquids which comprises a flow metering device having an inlet and outlet means wherein little heat transfer occurs between the ambient atmosphere external to the jacket and the flowing liquid. The metering device is enclosed in a jacket under sufficient vacuum that the metering scale of said device is capable of indicating flow.

The nature and characteristic features of the invention will be more readily understood from the following description, taken in connection with the accompanying drawing forming part hereof.

Referring to the FIGURE: 1 is the inlet line and 2 is the outlet line of a standard rotameter 3. Line 4 is a means for creating a vacuum in the surrounding jacket 8. Line 5 is connected to a valve for drainage if needed. The surrounding jacket 8 is of transparent material, such as a length of Pyrex pipe, and is sealed with flanges 6 and 7. Flanges 9 and 10 seal the outlet and inlet lines 2 and 1. The rotameter 3 comprises a metering scale 11 capable of indicating flow when said jacket 8 is under vacuum, a housing 12 therefor and having inlet 1 and outlet 2 means contained within and passing through the jacket 8.

Under the methods of the prior art and employing low flow rates, no amount of supercooling of chlorine prior to entering the rotameter would prevent boiling in the rotameter, and at any flow rate ice formation made reading the meter extremely difficult. The process of this invention has been successfully applied to the problem of metering liquid chlorine at pressures below 80 p.s.i.g. At 30 p.s.i.g. chlorine boils at $-16°$ C. Accordingly, the inlet line of a rotameter was jacketed with a carbon dioxide coil at $-40°$ C. and the rotameter was surrounded with a jacket under a vacuum of less than 10 mm. Under these conditions the meter functioned properly even at flow rates as low as fractions of a pound per hour.

A flow metering device is defined as a means for measuring the flow of a fluid wherein the fluid to be measured is passed through a transparent tube containing a float and a measuring scale.

Low boiling liquids are liquids boiling below the ambient temperature. The ambient temperature being the temperature of the medium surrounding the meter.

The jacket surrounding the metering device may be made of any material which will withstand the sub-pressures employed. It is necessary that at least a portion of the jacket be transparent so that the measuring scale of the metering device will be visible.

It will, of course, be understood that the description and drawing herein are illustrative merely, and that various modifications and changes may be made in the structure disclosed without departing from the spirit of the invention.

I claim:
1. A flow metering apparatus for low-boiling liquids which comprises, in combination, a rotameter device positioned within a cylindrical jacket therefor, said jacket being adapted to be maintained under vacuum and having means for observing the rotameter device, and said rotameter device having a metering scale capable of indicating flow when said jacket is under vacuum, and having inlet and outlet means contained within and passing through said jacket wall, said rotameter device being supported within said jacket by separate resilient flange means where the said inlet and outlet means pass through said jacket.
2. A flow metering apparatus for liquid chlorine which comprises, in combination, a rotameter device positioned within a cylindrical jacket therefor, said jacket being adapted to be maintained under vacuum and having means for observing the rotameter device, and said rotameter device having a metering scale capable of indicating flow when said jacket is under vacuum and having inlet and outlet means contained within and passing through said jacket wall, said rotameter device being supported within said jacket by separate resilient flange means where the said inlet and outlet means pass through said jacket.

References Cited in the file of this patent
UNITED STATES PATENTS

| | | |
|---|---|---|
| 1,886,179 | Goodloe | Nov. 1, 1932 |
| 2,333,884 | Porter | Nov. 9, 1943 |